United States Patent
Lippojoki et al.

(10) Patent No.: US 7,508,162 B2
(45) Date of Patent: Mar. 24, 2009

(54) METHOD AND APPARATUS FOR PROVIDING ELECTRICAL ENERGY TO A PORTABLE DEVICE FROM ENERGY STORAGE OF ANOTHER PORTABLE DEVICE

(75) Inventors: Ismo Lippojoki, Vantaa (FI); Petri Vuori, Salo (FI); Richard Petrie, Surrey (GB)

(73) Assignee: Nokia Corporation, Espoo (FI)

( * ) Notice: Subject to any disclaimer, the term of this patent is extended or adjusted under 35 U.S.C. 154(b) by 175 days.

(21) Appl. No.: 11/400,588

(22) Filed: Apr. 7, 2006

(65) Prior Publication Data

US 2007/0236975 A1 Oct. 11, 2007

(51) Int. Cl.
*H01M 10/46* (2006.01)

(52) U.S. Cl. .................. 320/103; 320/116

(58) Field of Classification Search ............... 320/107, 320/116, 117, 118, 119, 103, 138
See application file for complete search history.

(56) References Cited

U.S. PATENT DOCUMENTS

| | | | |
|---|---|---|---|
| 2002/0051368 A1 | 5/2002 | Ulinski et al. | 363/1 |
| 2002/0147036 A1 | 10/2002 | Taguchi et al. | 455/573 |
| 2003/0050102 A1 | 3/2003 | Roh | 455/573 |
| 2003/0178967 A1 | 9/2003 | Khatri | 320/103 |
| 2004/0027109 A1 | 2/2004 | Chen | 323/283 |
| 2004/0217733 A1 | 11/2004 | Liu et al. | 320/114 |

FOREIGN PATENT DOCUMENTS

WO WO 03/105311 12/2003

OTHER PUBLICATIONS

Article from www.mobile-review.com/review/sonyericcson-btcar-en.shtml regarding Sony Ericsson Bluetooh Car, Eldar Murtazin, published Oct. 23, 2003.

*Primary Examiner*—Edward Tso
(74) *Attorney, Agent, or Firm*—Ware, Fressola, Van Der Sluys & Adolphson

(57) ABSTRACT

A method comprises the steps of determining values of one or more parameters of a first energy reservoir in a first device and corresponding parameters of a second energy reservoir in a second device, and setting a direction for transferring energy between the first energy reservoir and the second energy reservoir. The direction may be set based on the voltage of the first energy reservoir and the voltage of the second energy reservoir, based on an input from a user, or based on the values of one or more parameters of the first energy reservoir and the second energy reservoir obtained in a device-to-device communication between the first device and the second device. A bi-directional charging interface for executing the method comprises two energy paths in opposite directions and a control unit for setting the direction for the energy transfer.

25 Claims, 9 Drawing Sheets

(A)

(B)

METHOD AND APPARATUS FOR PROVIDING ELECTRICAL ENERGY TO A PORTABLE DEVICE FROM ENERGY STORAGE OF ANOTHER PORTABLE DEVICE

TECHNICAL FIELD

This invention relates to supplying energy to portable electronic devices.

Particularly, this invention pertains to bi-directionally balancing energy between energy reservoirs of two or more mobile devices, so that the energy stored in one device can be shared among other devices.

BACKGROUND ART

Nowadays, more and more people are using mobile devices for various purposes. A mobile device user may have a plurality of mobile devices for use at the same time. Usually each mobile device has a rechargeable energy reservoir, such as a battery, that obtains energy for storage in the reservoir through a charging device designed specifically for the device or the device's battery. FIG. 1 is a schematic diagram of a device being charged according to the prior art. When a mobile device 100 is in need of charging its battery 130, it is connected, through an inlet connector 110, to a direct current (DC) power source 200. The DC power source may be a power adapter. The adapter has an input end and an output end. The input end is plugged into a regular alternating current (AC) power outlet (100-240V AC). The output end has a galvanic (connector) or non-galvanic (induction field) connection point that is plugged into or coupled with the inlet connector (jack) 110 of the device 100. The DC current from the adapter 200 charges the battery 130 of the mobile device 100. The mobile device typically also contains one or more device circuits 140 that are powered by the battery 130. A conductive connection from the inlet jack 110 to the battery 130 may further contain a controlling element 120 that can disconnect the charging current flow when the battery is full. For many conventional mobile devices, the controlling element 120 is merely a switch. The charging current only flows in one direction, namely from the power source to the device. Commonly, a power adapter is designed for a particular device or for a particular type of battery and for a certain AC voltage. The adapter may not be used for charging a device it is not designed for.

There are problems with the above arrangement. Sometimes a user with a plurality of devices may find that some devices are fully charged and ready to use, others are low on battery level. If the user is traveling, in order to charge all the devices, all the chargers for these devices have to be brought along. The user must make sure that these chargers work properly, because in a remote location the AC outlet might have a different line voltage or a different plug design that would render the chargers unusable. In situations where a device is low on battery and the adapter for charging the device is not available or useable, it is desirable that the device is able to draw energy from an energy reservoir of another device or from a portable energy source such as a battery pack. This means one of the devices should be able to act as a "donor" to provide its stored energy to other devices.

Therefore, what is needed is a method that enables balancing or sharing energy reservoirs between two or more mobile devices. Preferably, an apparatus for performing the method is a simple and compact unit, and may be integrated into a mobile device.

SUMMARY OF THE INVENTION

In a first aspect of the invention, a method is provided. The method comprises the steps of determining values of one or more parameters of a first energy reservoir in a first device and corresponding parameters of a second energy reservoir in a second device; and setting a direction for transferring energy between the first energy reservoir and the second energy reservoir.

In the method, the one or more parameters may include a voltage, and the direction for transferring energy between the first energy reservoir and the second energy reservoir is set based on the voltage of the first energy reservoir and the voltage of the second energy reservoir.

Or, in the method, the direction for transferring energy between the first energy reservoir and the second energy reservoir may be set based on an input from a user.

Or, in the method, the one or more parameters may include one or more of a maximum state of charge, a maximum voltage, a current state of charge, a current voltage and a current energy consumption, and the direction for transferring energy between the first energy reservoir and the second energy reservoir is set based on the values of the one or more said parameters of the first energy reservoir and the second energy reservoir obtained in a device-to-device communication between the first device and the second device.

In the method, an apparatus for executing the method may be interconnected between the first energy reservoir, an electrical load in the first device, and the second energy reservoir. The method may further comprise the step of determining whether an energy flow from the second energy reservoir is to be directed to the first energy reservoir, to the electrical load, or is to be shared between the first energy reservoir and the electrical load.

In a second aspect of the invention, an apparatus, connected between a first energy reservoir in a first device and a second energy reservoir in a second device, is provided. The apparatus comprises means for determining values of one or more parameters of the first energy reservoir and corresponding parameters of the second energy reservoir, and means for setting a direction for transferring energy between the first energy reservoir and the second energy reservoir.

In the apparatus, the one or more parameters may include a voltage, and means for setting the direction for transferring energy between the first energy reservoir and the second energy reservoir may comprise means for setting the direction based on the voltages of the first energy reservoir and the second energy reservoir.

Or, the apparatus may further comprise a user interface, and the means for setting the direction for transferring energy between the first energy reservoir and the second energy reservoir may comprise means for setting the direction based on an input from a user to the apparatus through the user interface.

The user interface may be a conductor connecting the first energy reservoir of the first device and the second energy reservoir of the second device. The conductor may comprise means for only allowing transferring energy either from the first device to the second device or from the second device to the first device.

In the apparatus, the one or more parameters may include one or more of a maximum state of charge, a maximum voltage, a current state of charge, a current voltage and a current energy consumption. The means for setting a direction for transferring energy may comprise means for setting the direction based on the values of one or more said parameters of the first energy reservoir and the second energy reservoir obtained in a device-to-device communication between the first device and the second device.

The apparatus may be associated with the first device, and the means for determining one or more parameters of the first energy reservoir and corresponding parameters of the second energy reservoir may comprise means for communicating with the second device to obtain the values of the one or more parameters of the second energy reservoir.

The apparatus may be interconnected between the first energy reservoir in the first device, an electrical load in the first device, and the second energy reservoir in the second device. The apparatus may further comprise means for determining whether an energy flow from the second energy reservoir is to be directed to the first energy reservoir, to the electrical load, or is to be shared between the first energy reservoir and the electrical load.

In a third aspect of the invention, a bi-directional charging interface, communicatively coupled between a first energy reservoir in a first device and a second energy reservoir in a second device, is provided. The interface comprises a first energy path, for conducting an energy flow from the second energy reservoir to the first energy reservoir; a second energy path, for conducting an energy flow from the first energy reservoir to the second energy reservoir; and a control unit, for determining values of one or more parameters of the first energy reservoir and corresponding parameters of the second energy reservoir, and for setting up a transfer of energy between the first energy reservoir and the second energy reservoir through either the first energy path or the second energy path.

The bi-directional charging interface may further comprise a user interface for receiving a user's input to the control unit, the input determines the transfer of energy between the first energy reservoir and the second energy reservoir is to be carried out through the first energy path or the second energy path.

The interface may be associated with the first device, and the control unit is capable for determining the values of the one or more parameters of the first energy reservoir and corresponding parameters of the second energy reservoir through a device-to-device communication with a second bi-directional interface in the second device, and for setting up a transfer of energy between the first energy reservoir and the second energy reservoir through either the first energy path or the second energy path based on results of the device-to-device communication.

The interface may be interconnected between the first energy reservoir in the first device, an electrical load in the first device, and the second energy reservoir in the second device. The interface may further comprise a status switching unit, operated by the control unit, for determining whether an energy flow from the second energy reservoir is to be directed to the first energy reservoir, to the electrical load, or is to be shared between the first energy reservoir and the electrical load.

A device, comprising the bi-directional charging interface, is provided. The device may be a mobile electronic device.

A portable battery pack, comprising one or more bi-directional charging interfaces, is provided. Each of the one or more bi-directional charging interfaces is independently connectable to a second device for transferring energy between the battery pack and the second device.

In a fourth aspect of the invention, a computer program product is provided. The product comprises a computer readable storage structure embodying computer program code thereon for execution by a computer processor in a device, said device is connected with a second device for balancing energy between the device and the second device via a bi-directional charging interface. The product comprises instructions for determining values of one or more parameters of a first energy reservoir in the device and corresponding parameters of a second energy reservoir in the second device, and instructions for setting a direction for transferring energy between the first energy reservoir and the second energy reservoir.

In the computer program product, the one or more parameters may include a voltage, and the instructions for setting a direction for transferring energy between the first energy reservoir and the second energy reservoir may comprise instructions for setting the direction for transferring energy based on the voltage of the first energy reservoir and the second energy reservoir.

In the computer program product, the one or more parameters may include a maximum state of charge, a maximum voltage, a current state of charge, a current voltage and a current energy consumption, and the instructions for setting the direction for transferring energy may comprise instructions for setting the direction based on one or more said parameters of the first energy reservoir and the second energy reservoir obtained in a device-to-device communication between the device and the second device.

The bi-directional charging interface may be interconnected between the second energy reservoir, the first energy reservoir and an electrical load in the device. The product may further comprise instructions for determining whether an energy flow from the second energy reservoir is to be directed to the first energy reservoir, to the electrical load, or is to be shared between the first energy reservoir and the electrical load.

BRIEF DESCRIPTION OF THE DRAWINGS

The above and other objects, features and advantages of the invention will become apparent from a consideration of the subsequent detailed description presented in connection with accompanying drawings, in which.

DETAILED DESCRIPTION OF THE INVENTION

This invention provides a simple and compact way for balancing and sharing energy between energy reservoirs of two or more mobile devices. It provides a bi-directional charging interface that can be incorporated into a mobile device or a portable energy source such as a battery pack. In using the invention according to the following disclosure, the portable battery pack can be treated as a mobile device, even though it does not have electrical circuitry for performing functions of a mobile device.

The invention is disclosed in the following exemplary embodiments.

FIRST EMBODIMENT OF THE INVENTION

Figure 1:
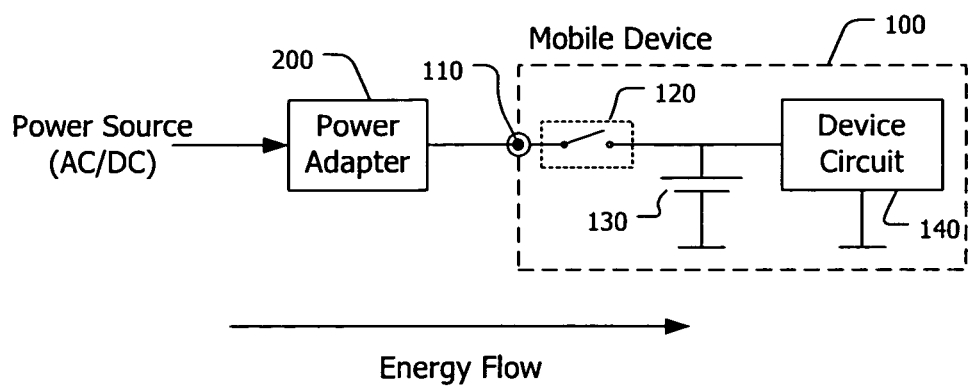
FIG. 1 is a schematic diagram of charging a mobile device's battery according to the prior art.
Figure 2A:
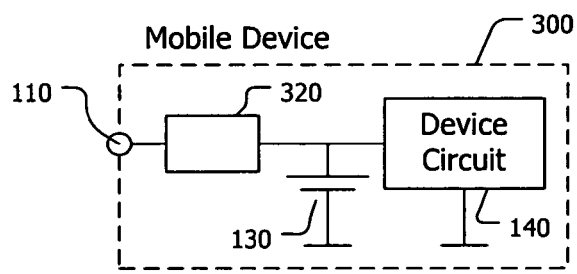
FIG. 2(a) is a schematic diagram of a mobile device incorporating a bi-directional charging interface, according to a first embodiment of the invention.

As shown in FIG. 2(a), a mobile device 300 comprises a power inlet jack 110 for receiving a charging current from an external energy source or for providing a charging current to an external recipient device, one or more circuits 140 (an electrical load) for performing functions of the mobile device, an energy reservoir such as a rechargeable battery 130 for providing electrical energy to the circuits, and a bi-directional charging interface 320 connected between the power inlet jack 110 and the battery 130/circuit 140.

Figure 2B:
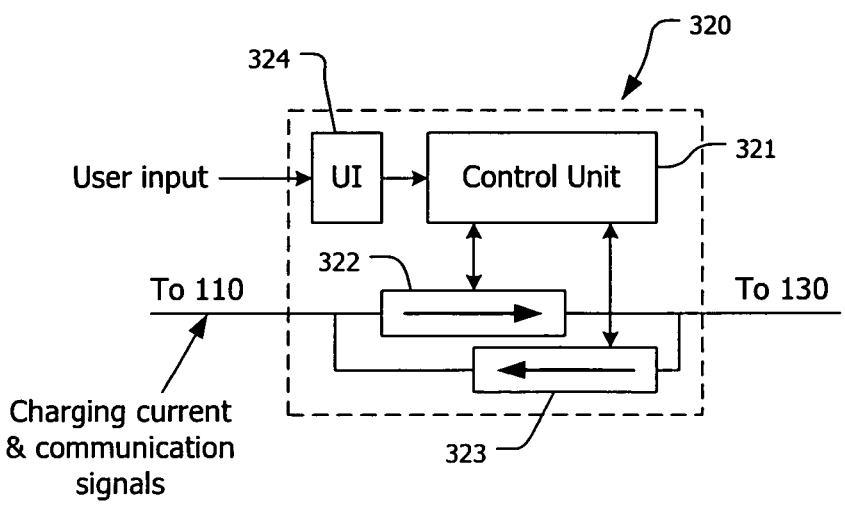
FIG. 2(b) is a block diagram of the bi-directional charging interface, according to the first embodiment of the invention.

As shown in FIG. 2(b), the bi-directional charging interface 320 comprises two energy paths, an inward path 322 and an outward path 323, connected in parallel, a control unit 321 and, optionally, a user interface 324. The control unit 321 is capable of controlling the operation of the inward path 322 and the outward path 323 so as to set a direction for an energy flow between the power inlet jack 110 and the battery 130. The control unit may also be capable of conducting a device-to-device communication with another such bi-directional charging interface. The user interface 324 is capable of receiving a user's input to the control unit 321 for controlling the operation of the inward path 322 and the outward path 323.

As also shown in FIG. 2(b), the bi-directional charging interface 320 has an input end, connecting to the power inlet jack 110, and an output end, connecting to a terminal of the battery 130. For the device-to-device communication mentioned above, the communication signals between the interfaces may be carried by the same electrical connection that conducts the charging current. The bi-directional charging interface 320 acts, at an inward direction, as the gateway for an external energy flow from the power inlet 110 to the battery 130 and the device circuit 140. At an outward direction, it provides a charging current from the battery 130 to the inlet jack 10, from where the energy stored in the battery 130 flows toward an energy reservoir or a circuit of another device.

There are three ways based on which the direction of the energy flow is determined: (1) based on the energy levels of the battery and the energy reservoir (such as a battery) in the other device, (2) based on the results of a device-to-device communication between the bi-directional charging interface and another bi-directional charging interface in the other device, and (3) based on a user's intent. Each of the methods is demonstrated by an example below.

EXAMPLE 1

Figure 3:
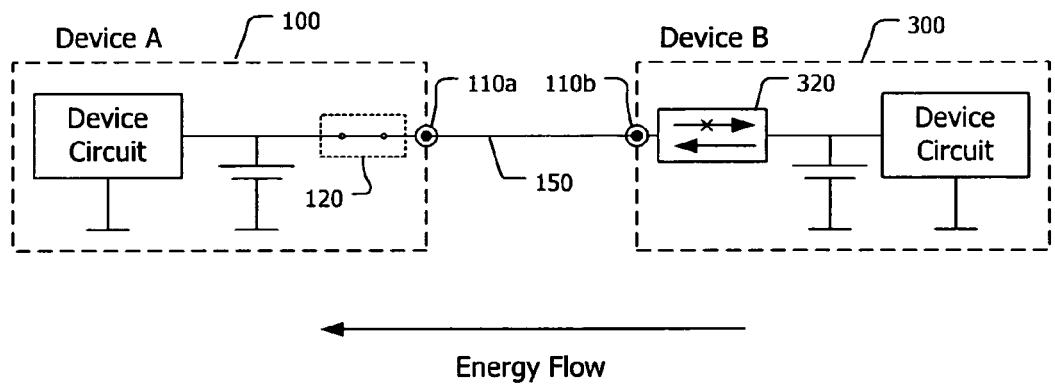
FIG. 3 is a schematic diagram of the mobile device connected to a conventional mobile device for providing energy to the conventional mobile device.

Balancing Energy Between a Device with the Bi-directional Charging Interface and Another Device Without the Interface As shown in FIG. 3, a mobile device 300 (device B) having a bi-directional charging interface 320 is connected to another mobile device 100 (device A). The device A does not have a bi-directional charging interface and the capability to communicate with another device regarding its battery characteristics. The device A only has a one-directional charging interface (such as a switch unit 120) that only allows a charging current flowing into the battery of the device. The device A and the device B are connected to each other by a charging cable 150 at their respective power inlet jacks 110a and 110b. The energy level (represented by a measurable parameter such as battery voltage) of the device A is detected by the device B through the bi-directional charging interface of the device B. Assuming that the battery voltage of the device A is lower than that of the device B, the control unit of the bi-directional charging interface 320 automatically directs the charging current flow from the device B to the device A (the outward path in the interface 320 is open, indicated in FIG. 3 as an uncrossed outward arrow, and the inward path is closed, indicated in the figure as a crossed arrow). The battery of the device A is charged until the switch unit 120 of device A disconnects the current (when the battery of the device A is full) or until the bi-directional charging interface 320 disconnects the current (when the battery voltage of the device A reaches a certain level).

In this example, there is no device-to-device communication, even though the bi-directional charging interface 320 is capable of initializing such a communication. A communication request from the device B would not yield any meaningful response from the device A. Instead, the device B detects the connection of the cable 150 and the load of the device A, obtains the voltage level of the device A, and initializes the energy transfer from the device B to the device A. The only parameter about the device A that is available to the device B is the device A's battery voltage, and the device B initialize the charging based on the difference between the battery voltages of the device B and the device A.

In many situations, voltage by itself is not a good indication for use in setting the charging direction. It is possible that the so-determined donor device has a low-capacity battery that is full (with a high apparent battery voltage) but the amount of energy stored in it is meaningless for a high-capacity recipient battery.

EXAMPLE 2

Figure 4:
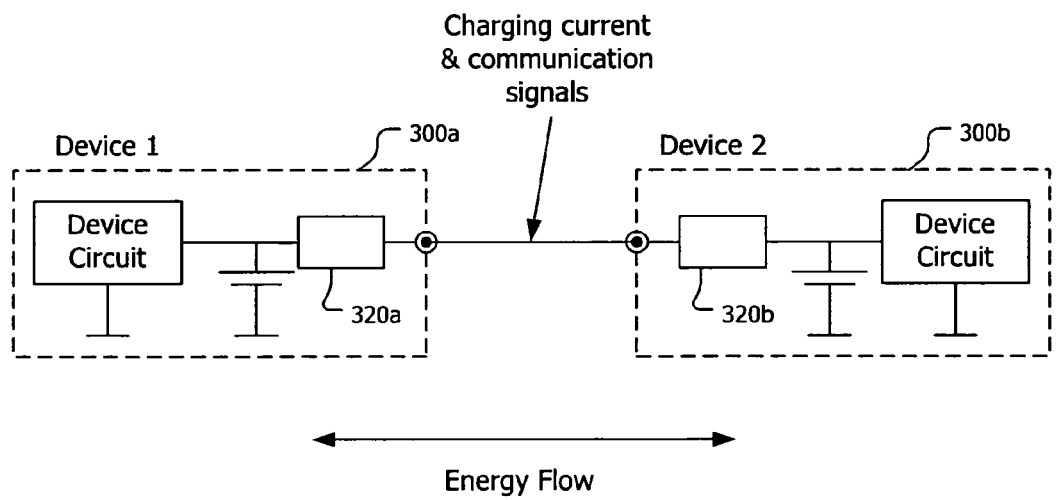
FIG. 4 is a schematic diagram of the mobile device connected to another mobile device for balancing energies between the devices automatically or according to a user's intent.

Balancing Energy Between Two Devices Each Having the Bi-directional Charging Interface As shown in FIG. 4, a first device 300a (device 1) and a second device 300b (device 2), both having the bi-directional charging interface of this invention (320a and 320b), are connected to each other for balancing energy between the devices. The direction of the energy flow can be either from device 1 to device 2, or from device 2 to device 1, depending on the results from a device-to-device communication between the two interfaces. The devices 1 and 2 are connected to each other by a charging cable 150 at their respective power inlet jacks. The charging cable 150 carries the communication signals, as well as the charging current, between the two devices.

Figure 5:
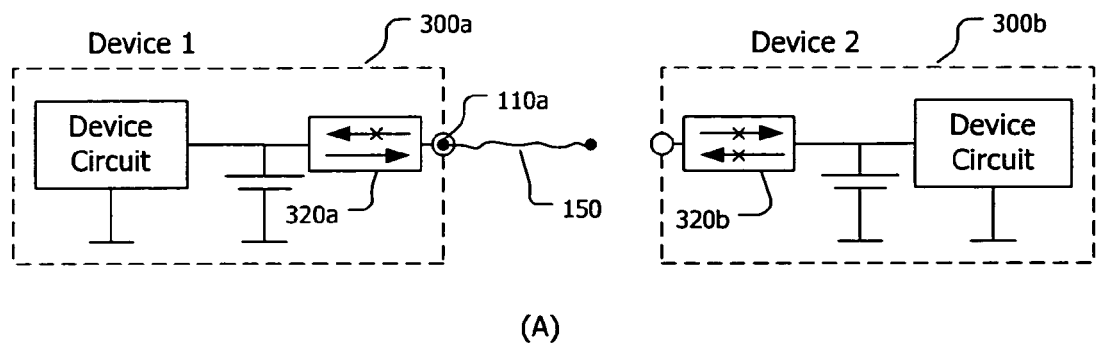
FIGS. 5(a) and (b) are the steps for two mobile devices to connect to each other and balancing energies according to results of a device-to-device communication.
Figure 5:
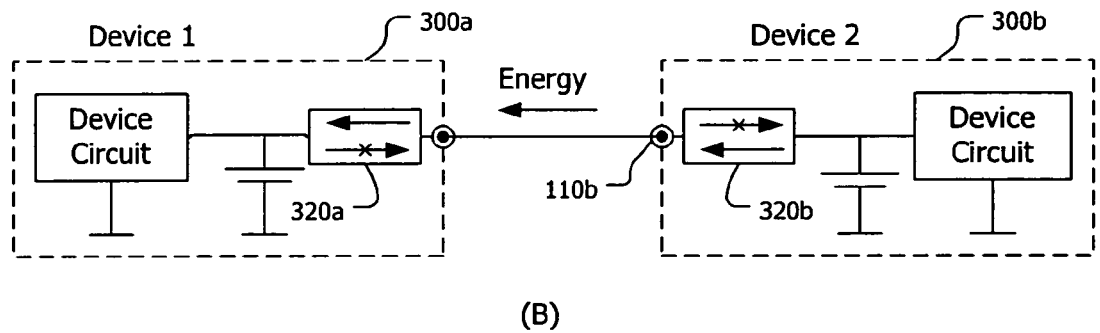

The steps for determining the direction of the current flow are illustrated in FIGS. 5(*a*) and 5(*b*). As shown in FIG. 5(*a*), in the beginning, one end of the charging cable 150 is plugged into the power inlet jack 110*a* of the device 1. The bi-directional charging interface 320*a* of the device 1 detects the cable 150 and sets the charging current direction as being toward the jack 110*a* (the outward path is open and the inward path is closed, as indicated by the arrows in FIG. 5(*a*)). The cable 150 is charged with a voltage that corresponds to the battery voltage of the device 1.

Next, as shown in FIG. 5(*b*), the other end of the cable 150 is plugged into the power inlet jack 110*b* of the device 2. The interface 320*a* of the device 1 detects a load. The interface 320*b* of the device 2 also detects that a cable has been plugged into the inlet jack 110*b* and the voltage carried by the cable 150. Interface 320*b* (or 320*a*) initiates a communication request. The interface 320*a* (or 320*b*) responds to the request. If the response is valid, a device-to-device communication link between the two interfaces 320*a* and 320*b* is established. Further in the communication, information regarding both energy reservoirs of the devices is exchanged. The information may include various parameters indicative of characteristics and conditions of the reservoirs. Characteristic parameters include battery type, capacity (e.g. maximum state of charge (in Watt×hour)), maximum voltage, etc. Condition parameters include age, whether the battery needs replacement, current state of charge, current voltage, current energy consumption, etc. Based on the information, the two interfaces agree on source (donor) device and target (recipient) device, energy balances (i.e. the maximum drain in terms of power (in Watt) and energy (in Watt×hour) from the source device to the target device) and other parameters.

An agreed-upon configuration of the interfaces is shown in FIG. 5(*b*), in which charging current flows from the device 2 to the device 1 as the outward path of interface 320*b* and the inward path of interface 320*a* are both open and paths in the opposite direction are both closed.

If, during the device-to-device communication, it is found that the energy reservoir of one of the devices (such as device 1) is already exhausted, the interface of the other device (such as device 2) automatically treats the device (device 1) as having a one-directional charging interface. Thus, only the charging current flowing from the device 2 to the device 1 is allowed.

Summarizing the above, a bi-directional charging interface in a device initializes a device-to-device communication with another bi-directional charging interface in another device when two devices are connected to each other for balancing energies in their batteries. The communication starts by one interface sending the other interface a communication request and waiting for a reply from the other interface. If a valid reply is received, the interface requests the other interface to send one or more parameters regarding the energy reservoir of the other device. It compares the parameters of the other reservoir with the parameters of its own energy reservoir and determines a direction for transferring the energy. The communication signals may be conducted through a cable connecting the two devices. The same cable is also used for conducting the energy flow.

EXAMPLE 3

Transferring Energy Between Two Devices Based on a User's Input

The direction for transferring energy between two devices can also be set by a user's input to one of the devices or by using a specially designed cable that only allows current flowing in one direction.

Figure 6:
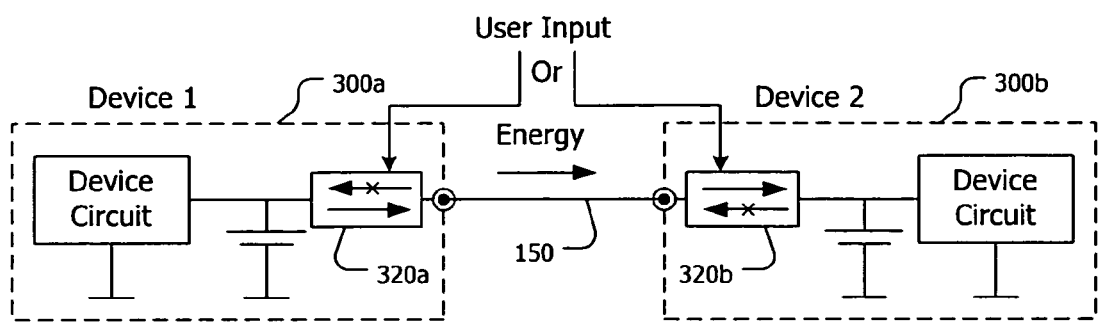
FIG. 6(a) is a schematic diagram of balancing energy between two devices according to a user's intent.
FIG. 6(b) is a cable for transferring energy between two devices; the cable is marked with energy flow direction.
Figure 6:
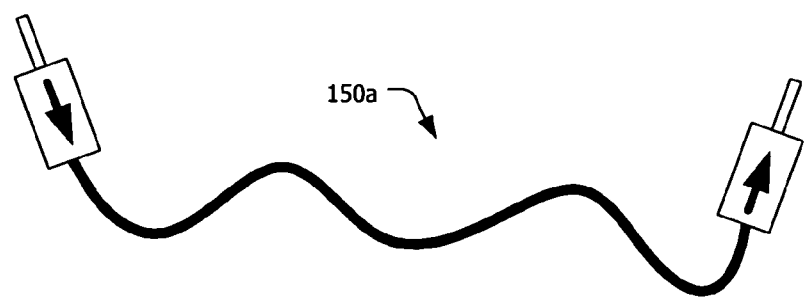

For example, with at least one of the devices having a bi-directional charging interface, a user may start or stop energy transfer, or change the current flow direction (if possible) by using a user interface of the bi-directional charging interface. The direction set by the user input may override the charging direction automatically set by the interface as in the previous examples. As shown in FIG. 6(*a*), where the device 1 and the device 2 both have a bi-directional charging interface, the user directs the energy flow from the device 1 to the device 2 by providing an input to the user interface in either the device 1 or the device 2.

Alternatively, the user's intention for setting the charging direction can be established by using a specially designed current conductor such as a charging cable. The charging cable is mono-directional. When connected between two devices, it only allows the charging current flow from one device to the other, but not reversed. The cable may comprise rectifying circuitry that allows a current in the right direction to pass and prevents a current in reversed direction. It may also contain analog or digital detection means for detecting the loads at both ends. As shown in FIG. 6(*b*), such a charging cable 150*a* looks like an ordinary connector, but is embedded with the circuitry and marked with arrows indicating the current flow direction for a user to easily understand.

If the energy reservoir of the device 2 has a higher voltage and the energy reservoir of the device 1 has a lower voltage, it is still possible to direct the charging current from the device 1 to the device 2 for charging the energy reservoir of the device 2 if the device 1 has switch-mode charging circuitry that can rise the voltage at the device 2's charge inlet to exceed the voltage of the device 2's energy reservoir.

Figure 7:
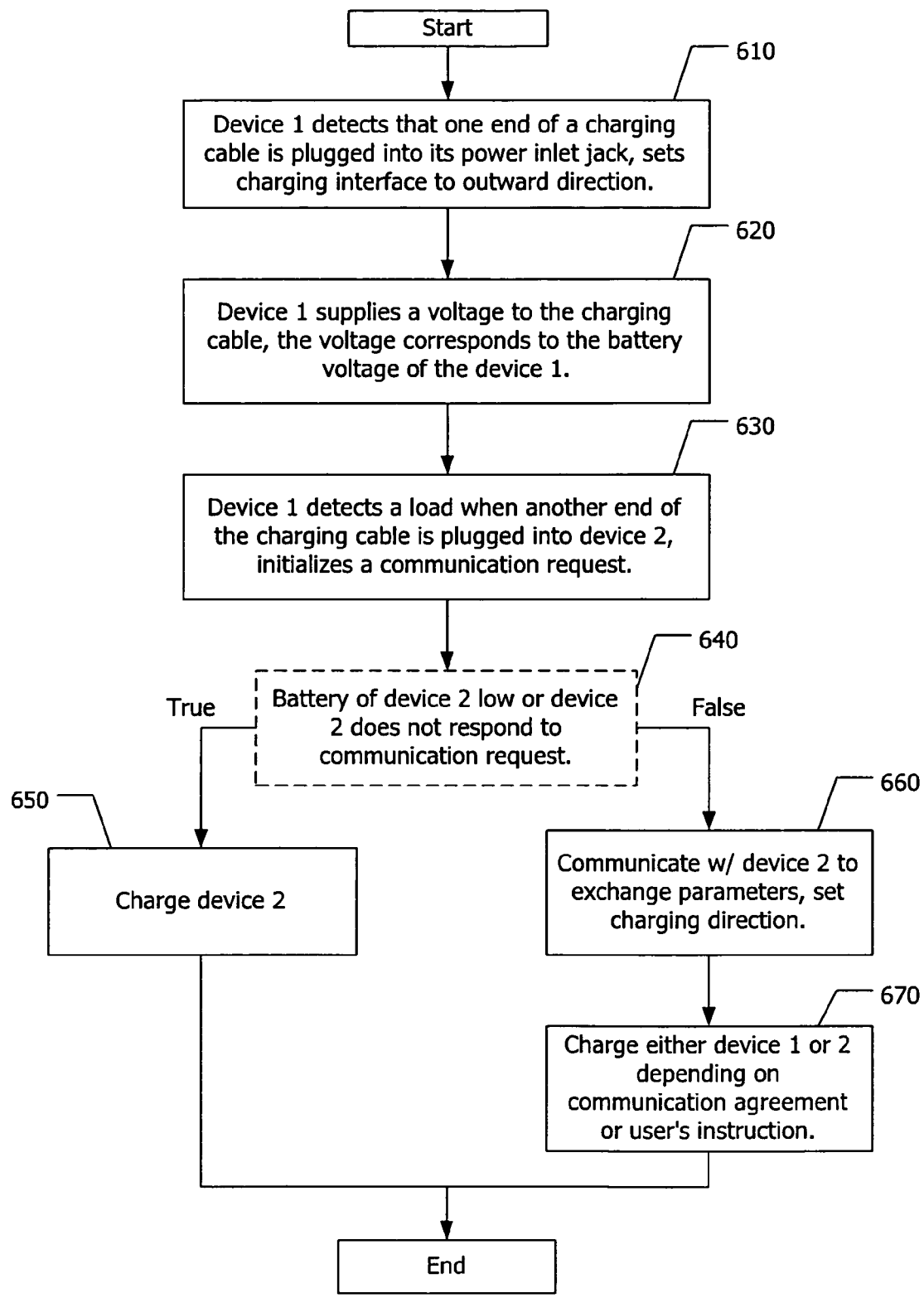
FIG. 7 is a flow diagram of the method for balancing energy between two devices, according to the first embodiment of the invention.

A flow diagram of the above-described embodiment is shown in FIG. 7. In a step 610, a first device detects that one end of a charging cable is plugged into its power inlet jack. It sets the charging interface to the outward direction. In a step 620, the first device supplies a voltage to the charging cable. The voltage corresponds to the battery voltage of the first device. In a step 630, the first device detects a load when the other end of the charging cable is plugged into a second device. It initializes a communication request with the second device. In a step 640, the first device determines if the battery of the second device is lower than a preset limit, or if the second device does not allow for bi-directional charging. If the battery of the second device is lower than a preset limit, or the second device does not allow for bi-directional charging (for example, a request by the first device for establishing a communication with the second device does not yield a valid response), in a step 650, the second device is charged with energy from the first device. Or on the other hand, if the second device allows for the bi-directional charging, i.e. its bi-directional charging interface responses to the communication request and the battery of the second device is not exhausted, in a step 660, the first device further communicates with the second device to discover each other's capacity and characteristics, and to set the charging direction and other parameters. Finally, in a step 670, an agreement is reached and either the first device or the second device is charged depending on the communication agreement or, alternatively, a user's instruction inputted from a user interface of either of the devices.

SECOND EMBODIMENT OF THE INVENTION

Figure 8A:
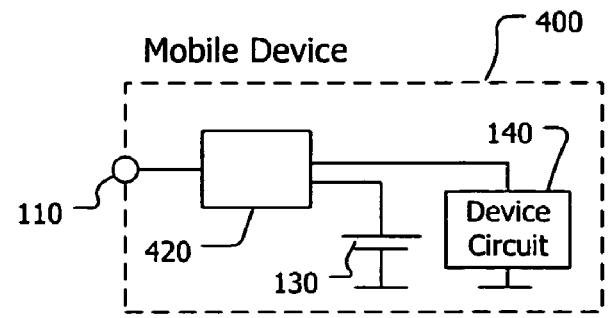
FIG. 8(a) is a schematic diagram of a mobile device incorporating a bi-directional charging interface according to a second embodiment of the invention.
Figure 8B:
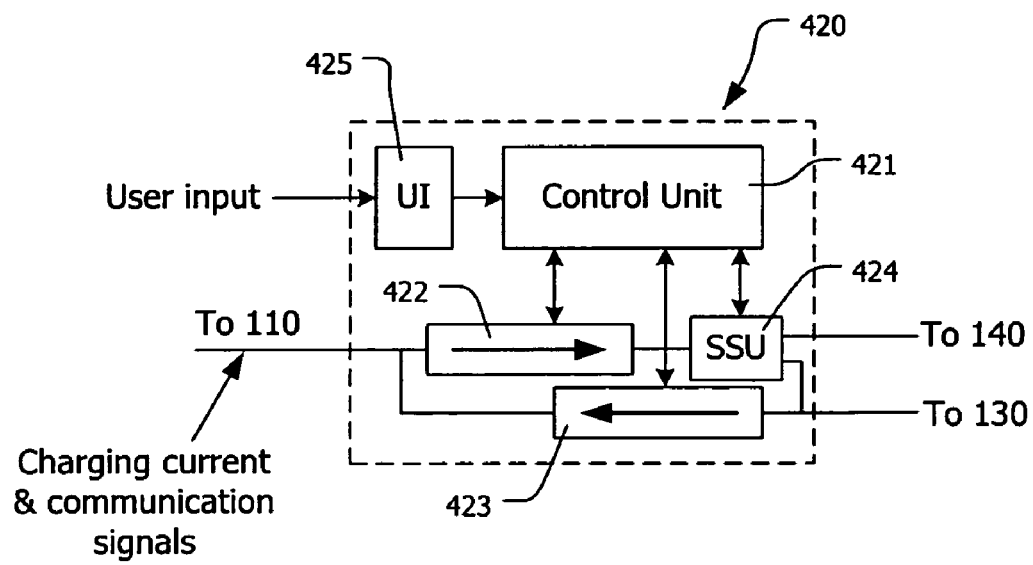
FIG. 8(b) is a block diagram of the bi-directional charging interface, according to the second embodiment of the invention.

FIG. 8(*a*) shows a mobile device 400 incorporating a bi-directional charging interface 420 according to the second embodiment of the invention. The mobile device 400 comprises a power inlet jack 110 for receiving a charging current from an external energy source or for providing a charging current to an external recipient device, one or more circuits 140 (an electrical load) for performing functions of the mobile device, an rechargeable battery 130, and the bi-directional charging interface 420.

As shown in FIG. 8(*b*), the bi-directional charging interface 420 comprises an inward path 422, an outward path 423, a control unit 421, a status switching unit (SSU) 424 for selectively direct an inward current to the battery 130 or to the circuit 140, or both, and, optionally, a user interface 425 for receiving a user's input to the interface. The control unit 421 is capable of controlling the operation of the inward path 422 and the outward path 423, capable of controlling the operation of the status switching unit 424, and capable of conducting a device-to-device communication with another such bi-directional charging interface. One end of the inward path 422 is connected to the inlet jack 110 and another end is connected to the status switching unit 424. One end of the outward path control 423 is also connected to the inlet jack 110 and another end is connected to the battery 130. The status switching unit 424 has one input end connected the inward path 422 and two output ends connected to the battery 130 and the circuit 140, respectively. The status switching unit has four states (see FIGS. 9(*a*)-(*d*)):

- 0: (Default) The battery and the circuit are connected to each other, the battery powers the circuit, no incoming charging current, the battery may provide energy to another device when the outward path is open (FIG. 9(*a*)).
- 1: Inward path is open, incoming charging current is directed to the battery and charges the battery only (FIG. 9(*b*)).
- 2: Inward path is open and the battery is full, the incoming charging current is directed to the circuit and the circuit operates by using the external power source (FIG. 9(*c*)).
- 3: Inward path is open, the incoming charging current is divided between the circuit and the battery (FIG. 9(*d*)).

Figure 9:
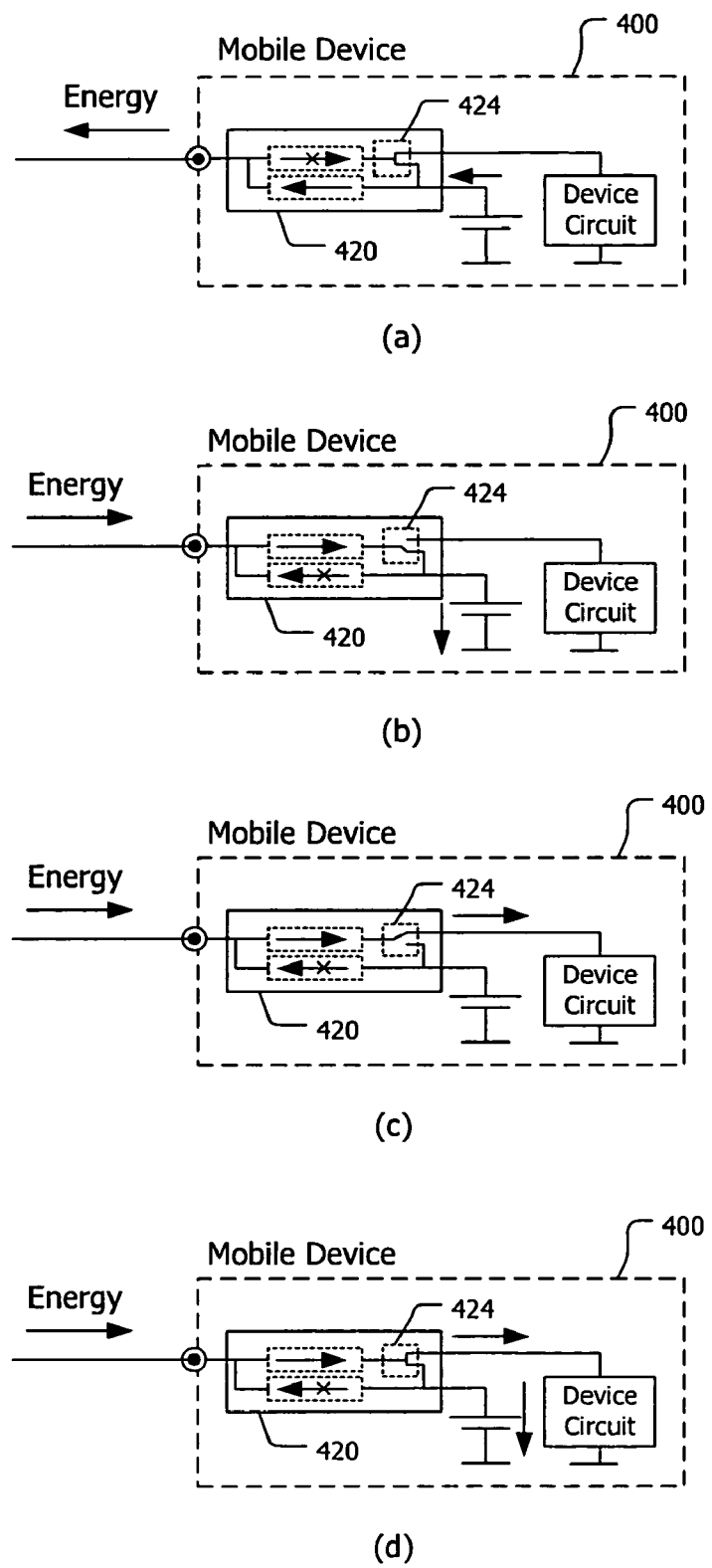
FIGS. 9(a)-(d) are status configurations of the bi-directional charging interface according to the second embodiment of the invention.

As seen in FIG. 9(*a*), when the battery of the mobile device is directed to supply a charging current to another device, the outward path is open and the inward path is closed. The energy flow therefore comes out of the battery. Meanwhile, the status switching unit is set at the default 0, which means the device's circuitry is connected to the battery and can be used while the battery is supplying power to another device.

As seen in FIG. 9(*b*), when the battery of the mobile device is in need of charge, the outward path is closed and the inward path is open. The status switching unit directs an incoming charging current to the battery by switching to status 1. This way, the current is supplied to the battery only for a rapid charge of the battery.

As seen in FIG. 9(*c*), when the battery is full, the status switching unit is switched to status 2. The circuitry of the device is connected with the external power source for performing its functions. The energy stored in the battery is preserved.

The last status, status 3, as shown in FIG. 9(*d*), is that the incoming charging current are shared between the battery and the circuitry, the status switch unit thus has the same connection as the default status 0 but the inward path is open and the outward path is closed. The device can be used while the external energy source is charging the device's battery.

When the device is not connected to another device or a charger, the state of the status switching unit is always at a default 0.

The operation of the status switching unit 424 is controlled by the control unit 421 for setting its states automatically or by an input from a user though the user interface 425.

Figure 10:
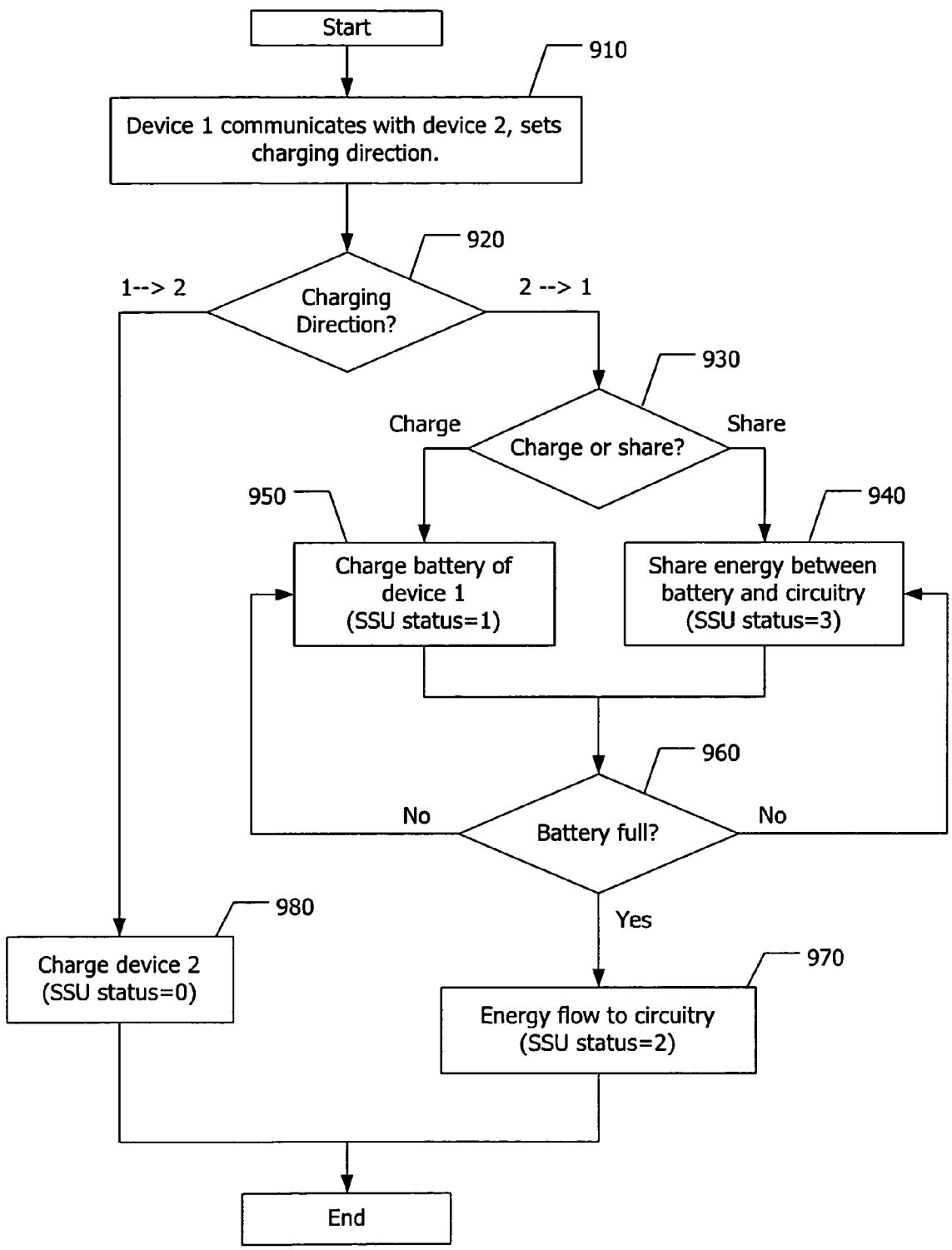
FIG. 10 is a flow diagram of the method for balancing energy between two devices, according to the second embodiment of the invention.
Figure 11:
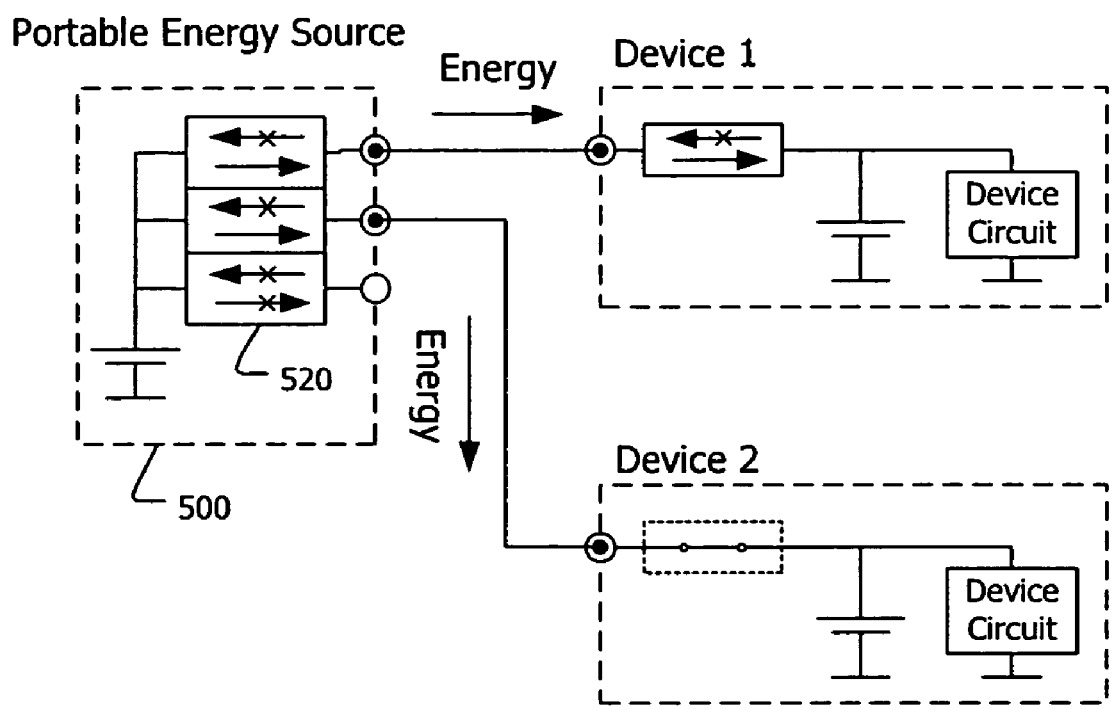
FIG. 11 is a schematic diagram of a portable battery pack with a plurality of bi-directional charging interfaces for independently balancing energies of one or more mobile devices.

A flow diagram of the above-described embodiment is shown in FIG. 10. In a step 910, a first device (device 1) communicates with a second device (device 2), sets the charging direction based on the device-to-device communication results or a user's intent. Assuming that the device 1 has the bi-directional charging interface as described above, the interface is configured depending on the agreed-upon charging direction (step 920). If the charging direction is set as from the device 1 to the device 2, in a step 980, the outward path is open and the SSU is set to status 0. The device 2 is charged with the energy flow from the device 1.

If the charging direction is set as from the device 2 to the device 1, the inward path of the interface is open for receiving an energy flow from the device 1. In a step 930, it is determined whether the incoming energy flow is supplied to the battery of the device 1 or shared between the battery and the circuitry of the device 1. Such a decision step can be performed by the interface automatically or by receiving a user's input from the user interface associated with the bi-directional charging interface. If the energy is to be supplied to the battery only, the SSU is set at status 1 (step 950). Otherwise, the SSU is set to status 3 (step 940). The interface then monitors the battery level of the device 1 (step 960). If the battery is full, in a step 970, the SSU switches to status 2, allowing the incoming energy to operate the circuit.

Further to the above embodiments, a bi-directional charging interface may comprise a plurality of pairs of independent inward path/outward paths. Such a bi-directional charging interface may be, for example, incorporated into a portable battery pack, each pair allows for one device to be connected through it to the battery pack. The device can be any type with or without the bi-directional charging interface. The battery pack, therefore, can simultaneously and independently exchange energies with one or more mobile devices. FIG. 10 is an example of such a system in which two mobile devices (devices 1 and 2) exchange energies with a portable energy source 500 through a multiple path bi-directional charge interface 520.

The invention provides the benefits of being able to share stored energy among devices in a multi-device environment. Typically, one of the devices (host device or source device) has a large-capacity energy reservoir that can be used to provide energy to several other devices. When these devices are interconnected, the energy can flow from the host device to other devices so that these other devices can conserve their own energy for an optimized usage. For instance, a device might have a half-charged battery that can only last two hours, with the connection to the host device that has a larger capacity battery, the device can draw energy form the battery of the host device and operate for a longer time. If several devices are interconnected, these devices can effectively share all the batteries of all the devices, allowing an operating time optimization between the devices. For example, a BLUETOOTH® headset, which has a small battery, is connected with a mobile phone, which has a larger battery. The mobile phone's battery supplies the energy to the headset so that the battery of the headset is charged with the energy drawn from the battery of the mobile phone, and/or the headset is operated directly with the battery of the mobile phone.

The present invention can be simple and low cost, and it can be made to work with all kinds of devices including conventional mobile devices that do not have the bi-directional charging interface. This invention can be used in mobile terminals in general and, in particular, as an integrated part of a 2-mm DC Charging Interface manufactured by Nokia Corporation.

In summary, this invention provides a method for transferring energy of energy reservoirs of mobile devices or portable energy sources using a simple power charge connection and a bi-directional charging interface. The method and the interface can be used for balancing energy between devices such as:

A mobile phone and a BLUETOOTH®-enabled peripheral device;

A mobile device and another mobile device;

A portable battery back and one or more mobile devices.

The present invention has been disclosed in reference to specific examples therein. Numerous modifications and alternative arrangements may be devised by those skilled in the art without departing from the scope of the present invention, and the appended claims are intended to cover such modifications and arrangements.

What is claimed is:

1. A method, comprising:
   determining values of one or more parameters of a first energy storage in a first device and corresponding parameters of a second energy storage in a second device; and
   setting a direction for transferring energy between the first device and the second device,
   wherein the direction of the energy transfer establishes that one of the first and second device is a source device and another is a target device, and the method further comprising:
   determining, if the target device has an electrical load, whether the energy from the source device is to be directed to the energy storage of the target device, to the electrical load of the target device, or to be shared between the energy storage and the electrical load of the target device.

2. The method of claim 1, wherein the one or more parameters include a voltage, and the direction for transferring energy between the first device and the second device is set based on the voltage of the first energy storage and the voltage of the second energy storage.

3. The method of claim 1, wherein the direction for transferring energy between the first device and the second device is set based on an input from a user.

4. The method of claim 1, wherein the one or more parameters include one or more of a maximum state of charge, a maximum voltage, a current state of charge, a current voltage and a current energy consumption, and the direction for transferring energy is set based on the values of the one or more parameters of the first energy storage and the second energy storage obtained in a device-to-device communication between the first device and the second device.

5. The method of claim 4, wherein an apparatus for executing the method is associated with the first device, and wherein determining the values of the one or more parameters of the first energy storage and corresponding parameters of the second energy storage comprises:
   communicating with the second device to obtain the values of the one or more parameters of the second energy storage.

6. The method of claim 5, wherein communicating with the second device comprises:
   requesting a response from the second device; and
   if the response from the second device is received, requesting and receiving from the second device the values of the one or more parameters of the second energy storage, or if the response from the second device is not received, determining the current voltage of the second energy storage;
   and wherein setting the direction for transferring energy between the first device and the second device comprises:
   setting the direction for transferring energy based on the values of the one or more parameters of the first energy storage and corresponding parameters of the second energy storage received from the second device, if the response from the second device is received; or
   setting the direction for transferring energy based on the current voltage of the first energy storage and the current voltage of the second energy storage, if the response from the second device is not received.

7. The method of claim 1, wherein the energy from the energy storage of the source device is directed to the energy storage of the target device for charging the energy storage of the target device, and to the electrical load of the target device after the values of the one or more parameters of the energy storage of the target device have reached a predetermined level.

8. The method of claim 1, wherein the energy from the energy storage of the source device is shared between the energy storage of the target device and the electrical load of the target device, and is directed to the electrical load of the target device after the values of the one or more parameters of the energy storage of the target device have reached a predetermined level.

9. The apparatus of claim 8, wherein the energy from the energy storage of the source device is directed to the energy storage of the target device for charging the energy storage of the target device, and to the electrical load of the target device after the values of one or more parameters of the energy storage of the target device have reached a predetermined level.

10. The apparatus of claim 8, wherein the energy from the energy storage of the source device is shared between the energy storage of the target device and the electrical load of the target device, and to the electrical load of the target device after the values of the one or more parameters of the energy storage of the target device have reached a predetermined level.

11. An apparatus, connected between a first device and a second device, wherein said apparatus is configured:
   determine values of one or more parameters of a first energy storage in the first device and corresponding parameters of the second energy storage in the second device, and
   set a direction for transferring energy between the first device and the second device,
   wherein the direction of the energy transfer establishes that one of the first and second device is a source device and another is a target device, and the apparatus is further configured to:

determine, if the target device has an electrical load, whether the energy from the energy storage of the source device is to be directed to the energy storage of the target device, to the electrical load of the target device, or to be shared between the energy storage and the electrical load of the target device.

12. The apparatus of claim 11, wherein the one or more parameters include a voltage, and the apparatus is configured to set the direction for transferring energy based on the voltage of the first energy storage and the voltage of the second energy storage.

13. The apparatus of claim 11, further comprising a user interface, wherein the apparatus is configured to set the direction for transferring energy based on an input from a user to the apparatus through the user interface.

14. The apparatus of claim 13, wherein the user interface comprises a conductor connecting the first energy storage of the first device and the second energy storage of the second device, said conductor is configured to only allow energy transfer either from the first device to the second device or from the second device to the first device.

15. The apparatus of claim 11, wherein the one or more parameters include one or more of a maximum state of charge, a maximum voltage, a current state of charge, a current voltage and a current energy consumption, and the apparatus is configured to set a direction for transferring energy based on the values of the one or more parameters of the first energy storage and the second energy storage obtained in a device-to-device communication between the first device and the second device.

16. The apparatus of claim 15, wherein the apparatus is associated with the first device, and the apparatus is configured to determine the values of the one or more parameters of the first energy storage and corresponding parameters of the second energy storage by communicating with the second device to obtain the values of the one or more parameters of the second energy storage.

17. The apparatus of claim 16, wherein in the communicating with the second device, the apparatus is configured to:
request a response from the second device; and
request and receive from the second device the values of the one or more parameters of the second energy storage, if the response from the second device is received, or determining the current voltage of the second energy storage, if the response from the second device is not received;
and wherein in setting the direction for transferring energy, the apparatus is configured to:
set the direction for transferring energy based on the values of the one ore more parameters of the first energy storage and corresponding parameters of the second energy storage received from the second device, if the response from the second device is received, or set the direction for transferring energy based on the current voltage of the first energy storage and the current voltage of the second energy storage, if the response from the second device is not received.

18. A bi-directional charging interface, communicatively coupled between a first device and a second device, comprising:

a first energy path, for transferring energy from a second energy storage in the second device to the first device;
a second energy path, for transferring energy from a first energy storage in the first device to the second device; and
a control unit, for determining values of one or more parameters of the first energy storage and corresponding parameters of the second energy storage, and for setting up a direction for transferring energy between the first device and the second device through either the first energy path or the second energy path,
wherein the direction of the energy transfer establishes that one of the first and second device is a source device and another is a target device, and the interface further comprising:
a status switching unit, operated by the control unit, for determining, if the target device has an electrical load, whether the energy from the energy storage of the source device is to be directed to the energy storage of the target device, to the electrical load of the target device, or to be shared between the energy storage and the electrical load of the target device.

19. The bi-directional charging interface of claim 18, further comprising a user interface for receiving a user's input to the control unit, said input determines the transfer of energy between the first device and the second device is to be carried out through the first energy path or the second energy path.

20. The bi-directional charging interface of claim 18, wherein the interface is associated with the first device, and the control unit is capable for determining the values of the one or more parameters of the first energy storage and corresponding parameters of the second energy storage through a device-to-device communication with a second bi-directional interface in the second device, and for setting up a transfer of energy between the first device and the second device through either the first energy path or the second energy path based on results of the device-to-device communication.

21. A device, comprising the bi-directional charging interface of claim 18.

22. The device of claim 21, wherein the device is a mobile electronic device.

23. A portable battery pack, comprising one or more bi-directional charging interfaces of claim 18, wherein each of the one or more bi-directional charging interfaces is independently connectable to a second device for transferring energy between the battery pack and the second device.

24. The bi-directional charging interface of claim 18, wherein the energy from the energy storage of the source device is directed to the energy storage of the target device for charging the energy storage of the target device, and to the electrical load of the target device after the values of one or more parameters of the energy storage of the target device have reached a predetermined level.

25. The bi-directional charging interface of claim 18, wherein the energy from the energy storage of the source device is shared between the energy storage of the target device and the electrical load of the target device, and to the electrical load of the target device after the values of the one or more parameters of the energy storage of the target device have reached a predetermined level.

* * * * *

UNITED STATES PATENT AND TRADEMARK OFFICE
CERTIFICATE OF CORRECTION

| | |
|---|---|
| PATENT NO. | : 7,508,162 B2 |
| APPLICATION NO. | : 11/400588 |
| DATED | : March 24, 2009 |
| INVENTOR(S) | : Lippojoki et al. |

It is certified that error appears in the above-identified patent and that said Letters Patent is hereby corrected as shown below:

In column 12 at line 57 (claim 11, line 2), after "configured" please insert --to--.

In column 13 at line 52 (claim 17, line 13), please delete "ore" and insert --or-- therefor.

Signed and Sealed this

Sixteenth Day of March, 2010

David J. Kappos
*Director of the United States Patent and Trademark Office*